United States Patent
Nasu et al.

(10) Patent No.: US 8,388,278 B2
(45) Date of Patent: Mar. 5, 2013

(54) INDEXABLE DRILL AND METHOD FOR ARRANGING INSERTS IN THE DRILL

(75) Inventors: Kazuchika Nasu, Itami (JP); Atsuhiko Maeta, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 929 days.

(21) Appl. No.: 12/520,338

(22) PCT Filed: Dec. 21, 2007

(86) PCT No.: PCT/JP2007/074700
§ 371 (c)(1),
(2), (4) Date: Jun. 19, 2009

(87) PCT Pub. No.: WO2008/078696
PCT Pub. Date: Jul. 3, 2008

(65) Prior Publication Data
US 2010/0034606 A1  Feb. 11, 2010

(30) Foreign Application Priority Data
Dec. 25, 2006  (JP) .................. 2006-347335
Apr. 4, 2007  (JP) .................. 2007-098150

(51) Int. Cl.
*B23B 51/02* (2006.01)
(52) U.S. Cl. .................. 408/1 R; 408/223; 408/211
(58) Field of Classification Search .................. 408/223, 408/224, 221, 230, 189, 713, 229, 1 R, 225, 408/211, 233, 231; 407/113–116
See application file for complete search history.

(56) References Cited

U.S. PATENT DOCUMENTS

| | | | | |
|---|---|---|---|---|
| 4,220,429 | A | * | 9/1980 | Powers et al. .................. 408/224 |
| 4,644,669 | A | * | 2/1987 | Greco .............................. 36/9 R |
| 4,844,643 | A | * | 7/1989 | Icks ................................ 407/42 |
| 5,509,761 | A | * | 4/1996 | Grossman et al. .............. 408/59 |

(Continued)

FOREIGN PATENT DOCUMENTS

| | | |
|---|---|---|
| CN | 1203841 A | 1/1999 |
| EP | 0 066 079 A1 | 12/1982 |

(Continued)

OTHER PUBLICATIONS

Extended European Search Report for corresponding EP Application No. 07851052.6-1262, dated Dec. 20, 2010, pp. 1-6.

(Continued)

*Primary Examiner* — Daniel Howell
(74) *Attorney, Agent, or Firm* — Ditthavong Mori & Steiner, P.C.

(57) ABSTRACT

An indexable drill which has cutting edges formed of a plurality of indexable inserts and which provides stable performance so that the accuracy of entrance hole diameter and exit hole diameter is improved and generation of burrs at the hole exit can be suppressed. Indexable inserts which form a center cutting edge and a peripheral cutting edge are attached to a drill main body at an end thereof. A ratio between a cutting contribution of the center cutting edge and a cutting contribution of the peripheral cutting edge is set such that the cutting contribution of the center cutting edge is larger. The indexable insert is disposed so at to project forward in the axial direction from the indexable insert so that an outer-end corner of the peripheral cutting edge engages a workpiece first.

2 Claims, 16 Drawing Sheets

U.S. PATENT DOCUMENTS

| | | | |
|---|---|---|---|
| 5,890,853 A * | 4/1999 | Hiranaka | 408/224 |
| 6,030,155 A * | 2/2000 | Scheer et al. | 408/59 |
| 6,929,432 B2 * | 8/2005 | Roman et al. | 408/223 |
| 6,948,891 B2 * | 9/2005 | Roman | 408/223 |
| 7,201,542 B2 * | 4/2007 | Fritsch et al. | 408/223 |
| 7,237,985 B2 * | 7/2007 | Leuze et al. | 408/227 |
| 2005/0260049 A1 * | 11/2005 | Kruszynski et al. | 408/223 |

FOREIGN PATENT DOCUMENTS

| | | | |
|---|---|---|---|
| EP | 0 549 548 B2 | | 5/2003 |
| JP | 54-116795 | * | 3/1978 |
| JP | 54116795 A | | 9/1979 |
| JP | 58-126113 | | 8/1983 |
| JP | 2704917 B2 | | 10/1997 |
| JP | 1029108 A | | 2/1998 |
| JP | 11235606 A | | 8/1999 |
| JP | 2000202703 A | | 7/2000 |

OTHER PUBLICATIONS

Israeli Office Action for Israeli Patent Application No. 199432 dated Jan. 29, 2012, pp. 1-6.

Chinese Office Action for corresponding CN Application No. 200780045126.9, dated Apr. 7, 2010, pp. 1-15 China.

Office Action for the corresponding Japanese Patent Application No. 2007-098150, dated Nov. 29, 2011 with partial English translation, pp. 1-5.

* cited by examiner (a)

(b)

(a)

(b)

INDEXABLE DRILL AND METHOD FOR ARRANGING INSERTS IN THE DRILL

TECHNICAL FIELD

The present invention relates to indexable drills having cutting edges formed of a plurality of indexable inserts. More particularly, the present invention relates to an indexable drill having stable cutting performance and capable of suppressing generation of burrs at a hole exit and a method for arranging inserts without changing the stable cutting performance of the drill even after a drill diameter is changed.

BACKGROUND ART

Examples of indexable drills used for forming holes in metal include drills disclosed in Patent Documents 1 and 2 given below and drills shown in FIGS. 16 and 17.

In these drills, a pair of plate-shaped indexable inserts 5 (see FIGS. 16 and 17 for the numeral) having a clamp hole at the center are used in combination with each other. The indexable inserts 5 are arranged at an end of a drill main body 1 at positions where distances from the drill center differ from each other and at phases different from each other by 180° in the circumferential direction of the drill. The indexable insert at the inner side of the drill forms a center cutting edge 8 and the indexable insert at the outer side of the drill forms a peripheral cutting edge 9.

In this type of drill, generally, the drill diameter is changed (drills having different outer diameters are formed) using indexable inserts with the same specification as follows. That is, as shown in FIG. 18, the drill diameter (½D in the figure shows the radius of the drill) is changed by moving the peripheral cutting edge 9 in the radial direction while the center cutting edge 8 is fixed.

In addition, when the edges engage a workpiece, a central section of the center cutting edge 8 or a central section of the peripheral cutting edge 9 engages the workpiece first.
Patent Document 1: Japanese Patent No. 2704917
Patent Document 2: Japanese Unexamined Patent Application Publication No. 11-235606

DISCLOSURE OF INVENTION

Problems to be Solved by the Invention

In the indexable drill of the related art disclosed in Patent Document 1, a central section of the center cutting edge or the peripheral cutting edge engages the workpiece first. Therefore, the cutting resistance (horizontal force component) at the time of engagement is not stable. This leads to problems such as variations in entrance hole diameter and increase of surface roughness at the entrance side of the hole. In addition, in the case where a through hole is formed, the cutting balance is disturbed when the drill exits the workpiece, which leads to variations in exit hole diameter and increase of surface roughness. When the drill exits the workpiece, an outer peripheral section of the drill exits later and a force which pushes the drill inward from the outer side is generated. Therefore, the hole diameter tends to be reduced at the exit side. Then, when the drill is pulled out from the hole, so-called return marks are often formed on the inner surface of the hole. In addition, burrs are easily generated when the drill exits the workpiece. More specifically, since the outer peripheral section exits later, thin pieces of material that cannot be easily cut remain at positions where the outer peripheral section exits the workpiece. The pieces of material are left without being cut off at the exit edge of a hole 11 formed in a workpiece W, as shown in FIG. 19, and burrs 12 are formed accordingly.

In addition, in the above-described method for changing the drill diameter according to the related art, only the peripheral cutting edge is moved in the radial direction while the center cutting edge is fixed. Therefore, a cutting contribution ratio (A:B in FIG. 18) between the center cutting edge and the peripheral cutting edge changes when the peripheral cutting edge is moved, and the cutting balance changes accordingly. As a result, performance of the drill (hole diameter and cutting resistance) will vary.

An object of the present invention is to provide an indexable drill which has cutting edges formed of a plurality of indexable inserts and which provides stable performance so that the accuracy of entrance hole diameter and exit hole diameter is improved and generation of burrs at the hole exit can be suppressed, and to maintain the stable cutting performance even after the drill diameter is changed.
Means for Solving the Problems In order to achieve the above-described object, according to the present invention, an indexable drill which includes at least two polygonal indexable inserts arranged at an end of a drill main body at positions where distances from a drill center differ from each other is structured as follows. That is, a cutting contribution of one of the indexable inserts that is disposed at an inner side of the drill is greater than a cutting contribution of another one of the indexable inserts that is disposed at an outer side of the drill with respect to the indexable insert at the inner side of the drill, and the indexable insert disposed at the outer side of the drill projects forward in an axial direction from the indexable insert disposed at the inner side of the drill. In addition, an outer-end corner of the indexable insert at the outermost position is at a foremost position so that the outer-end corner engages a workpiece first.

Preferred embodiments of the drill are as follows:

(1) The indexable inserts include two indexable inserts which are first and second indexable inserts arranged at the end of the drill main body at positions separated from each other by half turn in the circumferential direction of the drill. The first indexable insert is disposed at the inner side of the drill and forms a center cutting edge. The second indexable insert is disposed at the outer side of the drill and forms the peripheral cutting edge. A ratio between the cutting contribution of the center cutting edge and the cutting contribution of the peripheral cutting edge is set in the range of A:B=52:48 to 55:45.

(2) The first and second indexable inserts are parallelogram-shaped inserts having the same specification. The center cutting edge is formed of a ridgeline at a long side including an obtuse-angled corner of the corresponding parallelogram-shaped insert and inclined such that an outer end of the center cutting edge in the radial direction projects forward in the axial direction. The peripheral cutting edge is formed of a ridgeline at a short side including an acute-angled corner of the corresponding parallelogram-shaped insert and inclined in the same direction as the direction in which center cutting edge is inclined.

(3) Chip discharge flutes are provided in an outer periphery of the drill main body. The flutes are helical flutes which extend substantially ¼ turn around the drill main body 1, and a rise-start point at a terminating end of each helical flute is set at a position separated from the peripheral cutting edge by 85° to 95° in the circumferential direction.

To eliminate the variation in cutting performance when the drill diameter is changed, the present invention also provides a method for arranging inserts in an indexable drill including the steps of arranging first and second indexable inserts at an end of a drill main body at positions where distances from a drill center differ from each other and which are separated from each other by half turn in the circumferential direction of the drill; positioning the second indexable insert at an outer side of the drill so as to project forward in an axial direction from the first indexable insert at an inner side of the drill, so that an outer-end corner of the second indexable insert engages a workpiece first, and setting a ratio between a cutting contribution of a center cutting edge formed of the first indexable insert and a cutting contribution of a peripheral cutting edge formed of the second indexable insert in the range of A:B=52:48 to 55:45; and arranging the first and second indexable inserts at positions where the ratio between the cutting contributions of the center cutting edge and the peripheral cutting edge is maintained within the range of A:B=52:48 to 55:45 when an outer diameter of the indexable drill is changed.

Advantages

According to the drill of the present invention, the outer-end corner of the indexable insert at the outermost position is disposed at a foremost position, so that the outer-end corner engages the workpiece first. Therefore, the cutting resistance (horizontal component) at the time of engagement is stable. When the drill according to the related art engages a workpiece, the engagement point moves toward the outer side and an inward (direction from the outer periphery to the center) horizontal force component applied to the engagement section varies. This leads to a disturbance in the cutting balance. In contrast, according to the drill of the present invention, the outer-end corner of the indexable insert at the outermost position engages the workpiece first. Therefore, variation in the horizontal force component which occurs when the drill engages the workpiece can be reduced and the processing stability can be maintained.

In addition, in a process of forming a through hole, the outer end of the peripheral cutting edge exits first. Therefore, the tendency that the exit hole diameter is reduced can be reduced and the accuracy of the exit hole diameter can be improved. In addition, generation of return marks and burrs can be suppressed.

In the case where the center cutting edge is formed of the first indexable insert, the peripheral cutting edge is formed of the second indexable insert, and the ratio of the cutting contribution A of the center cutting edge to the cutting contribution B of the peripheral cutting edge is set in the range of A:B=52:48 to 55:45, the thrust and the horizontal force component applied in the cutting process can be reduced. Therefore, the stability of the cutting process can be particularly increased.

In addition, in the case where the center cutting edge is formed of a ridgeline at a long side of one of the parallelogram-shaped inserts with the same specification and the peripheral cutting edge is formed of a ridgeline at a short side of the other one of the parallelogram-shaped inserts, the number of kinds of the indexable inserts being used can be reduced and an economic effect can be obtained accordingly.

The helical flutes provided in the outer periphery of the drill main body may be formed so as to extend about ¼ turn around the drill main body, and a rise-start point of each flute at a terminating end thereof may be at a position separated from the peripheral cutting edge by 85° to 95° in the circumferential direction. In such a case, in a front view of the drill, terminating ends of lands of the drill main body are on both sides relative to the direction in which the horizontal force component is applied in the hole-forming process, and portions of the drill main body are disposed at those positions.

Therefore, the base end section of the drill main body has enough strength to endure the horizontal force component and vibration of the drill main body due to the horizontal force component can be suppressed.

In addition, according to a method for arranging inserts of the present invention, even when the drill diameter is changed, the ratio between the cutting contributions of the center cutting edge and the peripheral cutting edge is maintained equal to the ratio set before the drill diameter is changed. Therefore, variation in performance due to variation in the ratio between the cutting contributions can be prevented and stable cutting performance can be obtained even after the drill diameter is changed. Therefore, variation in the accuracy of the holes can be suppressed.

Figure 1:
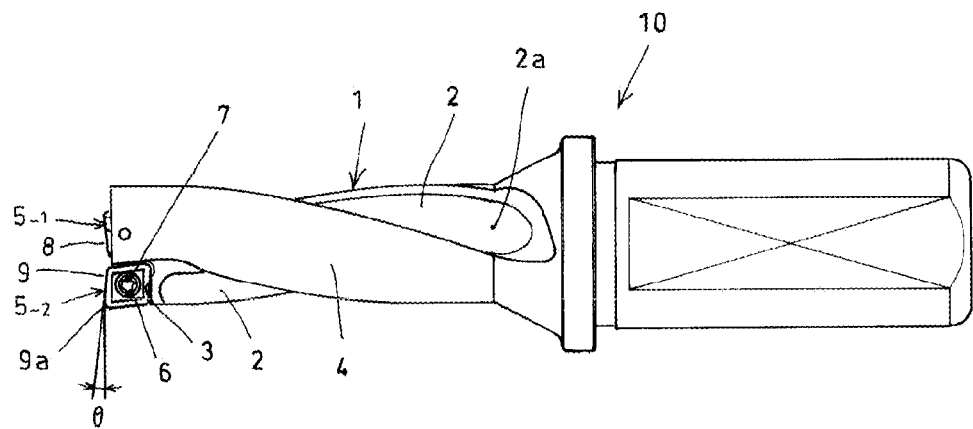
FIG. 1 is a side view of an example of a drill according to the present invention.

REFERENCE NUMERALS 1 drill main body
2 chip discharge flute
2a rise-start point
3 insert seat
4 land
$5_{-1}, 5_{-2}$ indexable inserts
6 clamp hole
7 clamp screw
8 center cutting edge
9 peripheral cutting edge
9a outer-end corner
10 drill
11 drilled hole
12 burr

BEST MODES FOR CARRYING OUT THE INVENTION

Embodiments of the present invention will be described with reference to FIGS. 1 to 6. FIGS. 1 to 5 show an example of an indexable drill according to the present invention. The drill 10 includes a drill main body 1, two indexable inserts $5_{-1}$ and $5_{-2}$ (sub-indices $_{-1}$ and $_{-2}$ are used for convenience in distinguishing one from the other) attached to an end of the drill main body at the periphery thereof, and clamp screws 7 which detachably fix the indexable inserts $5_{-1}$ and $5_{-2}$ to the drill main body 1.

The drill main body 1 includes two chip discharge flutes 2 at the outer periphery thereof, and insert seats 3 and 3 are provided at the end of the drill main body at positions separated from each other by half turn in the circumferential direction of the drill. The flutes 2 may be straight flutes. However, in the drill described as an example, helical flutes are formed. In addition, the insert seats 3 and 3 are provided at positions where distances from a rotational center O differ from each other.

The indexable inserts $5_{-1}$ and $5_{-2}$ are parallelogram-shaped inserts having clamp holes 6 at the center, and have the same specification (the same shape and the same size). The two indexable inserts $5_{-1}$ and $5_{-2}$ are attached to the insert seats 3 and 3 provided at the end of the drill main body 1, and are fixed to the drill main body 1 with the clamp screws 7.

One indexable insert (first indexable insert) $5_{-1}$ is disposed at the center of the drill main body 1 so as to extend beyond the rotational center O. A ridgeline at a long side of the insert $5_{-1}$ including an obtuse-angled corner of the insert $5_{-1}$ forms a center cutting edge 8 of the drill. The other indexable insert (second indexable insert) $5_{-2}$ is disposed at the outer periphery of the drill main body 1. A ridgeline at a short side of the insert $5_{-2}$ including an acute-angled corner of the insert $5_{-2}$ forms a peripheral cutting edge 9 of the drill.

Figure 2:
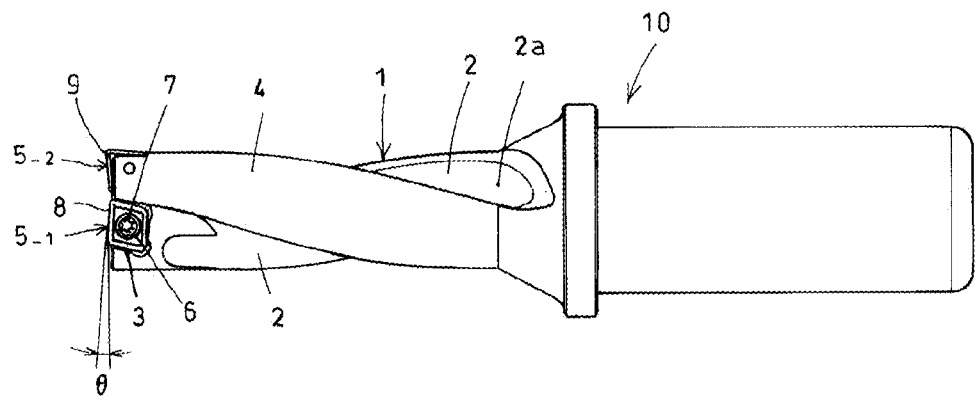
FIG. 2 is a side view of the drill in the state in which the drill is rotated by 180° from the position shown in FIG. 1.
Figure 3:
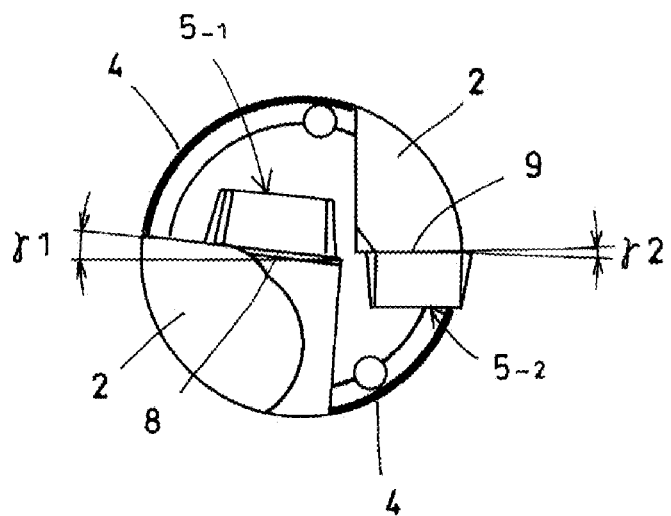
FIG. 3 is a front view of the drill shown in FIG. 1.
Figure 4:
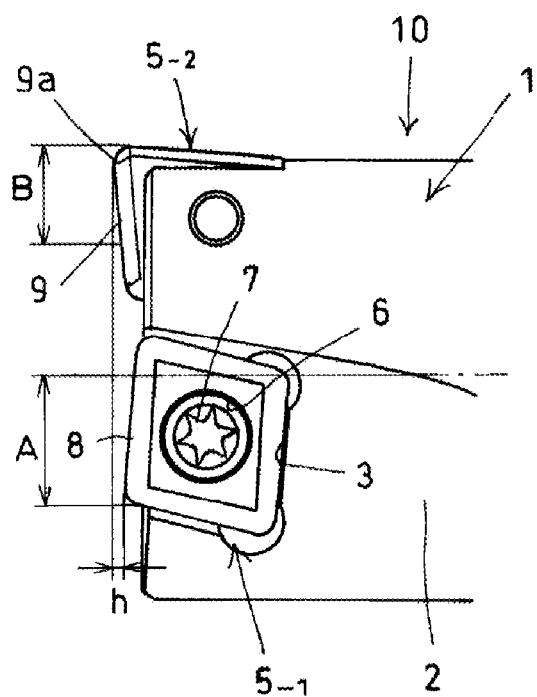
FIG. 4 is an enlarged side view of an end section of the drill shown in FIG. 2.

As shown in FIGS. 1 and 2, each of the center cutting edge 8 and the peripheral cutting edge 9 is inclined such that an outer end thereof in the radial direction projects forward in the axial direction. As shown in FIG. 4, the peripheral cutting edge 9 projects forward in the axial direction from the center cutting edge 8 by a certain distance h. Therefore, when the drill engages a workpiece, an outer-end corner 9a of the peripheral cutting edge 9 engages the workpiece first. In addition, when a through hole is formed, the outer-end corner 9a of the peripheral cutting edge 9 exits the workpiece first. As a result, variation in the horizontal force component caused when the drill engages the workpiece is reduced, so that the cutting balance can be prevented from being disturbed and variation in the accuracy of the hole entrance can be reduced. In addition, in the case where a through hole is formed, since the drill exits the workpiece at the outer peripheral section of the hole first, the tendency that the exit hole diameter is reduced at the exit can be eliminated and burrs are not easily generated. The amount h by which the peripheral cutting edge 9 projects from the center cutting edge 8 may be set such that the center cutting edge 8 engages the workpiece before the drill rotates one turn after the outer-end corner 9a of the peripheral cutting edge 9 engages the workpiece. In such a case, disturbance of the rotational balance doe not easily occur when the drill engages the workpiece. The amount of projection h is preferably set to a suitable value in consideration of a feed rate when the drill is used.

Figure 6:
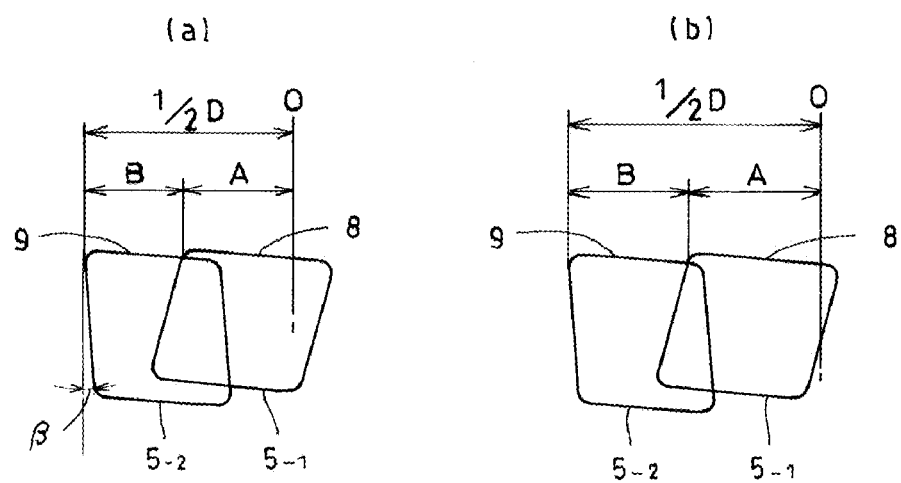
In FIG. 6, (a) is a diagram illustrating the loci of a center cutting edge and the peripheral cutting edge and (b) is a diagram illustrating the loci of the center cutting edge and the peripheral cutting edge after a drill diameter is changed.

Referring to FIG. 6, a cutting contribution A of the center cutting edge 8 is greater than a cutting contribution B of the peripheral cutting edge 9. In FIG. 6, ½D shows a radius of the drill. The ratio of the cutting contribution A of the center cutting edge 8 to the cutting contribution B of the peripheral cutting edge 9 is set in the range of A:B=52:48 to 55:45. This ratio is maintained constant irrespective of the drill diameter. When the drill diameter is changed (when drills having different outer diameters are formed using the inserts with the same specification), settings are made so as to maintain the ratio.

The drill diameter is changed by changing the positional relationship between the indexable inserts $5_{-1}$ and $5_{-2}$ forming the center cutting edge 8 and the peripheral cutting edge 9 from the relationship shown in FIG. 6(a) to that shown in FIG. 6(b), or from the relationship shown in FIG. 6(b) to that shown in FIG. 6(a). At this time, the indexable inserts are arranged at positions where the ratio of the cutting contributions A and B of the cutting edges is maintained after the drill diameter is changed. As shown in FIGS. 6(a) and 6(b), not only the position where the peripheral cutting edge 9 is fixed but also the position where the center cutting edge 8 is fixed is changed so that the range of selection of the drill diameter can be increased.

The two indexable inserts $5_{-1}$ and $5_{-2}$ whose arrangement positions are changed are attached to a drill main body (which is different from the drill main body used before the drill diameter is changed), and thus a drill having a different outer diameter is obtained. The thus-obtained drill is set such that the ratio between the cutting contribution A of the center cutting edge and the cutting contribution B of the peripheral cutting edge is equal to that before the drill diameter is changed. Therefore, variation in the cutting performances due to variation in the ratio between the cutting contributions does not occur.

As shown in FIG. 6, in the case where the parallelogram-shaped indexable inserts with the same specification are used as the center cutting edge 8 and the peripheral cutting edge 9, preferably, the ridgeline of a long side is assigned as the center cutting edge 8 with the large cutting contribution and the ridgeline of a short side is assigned as the peripheral cutting edge 9 with the small cutting contribution. Thus, indexable inserts having the same specification can be used in drills with different diameters. The shape of the indexable inserts is preferably such that the ridgeline at the long side is about 1.1 times as long as the ridgeline at the short side. In such a case, the diameter can be largely changed while maintaining the optimum length ratio between the center cutting edge and the peripheral cutting edge.

Figure 5:
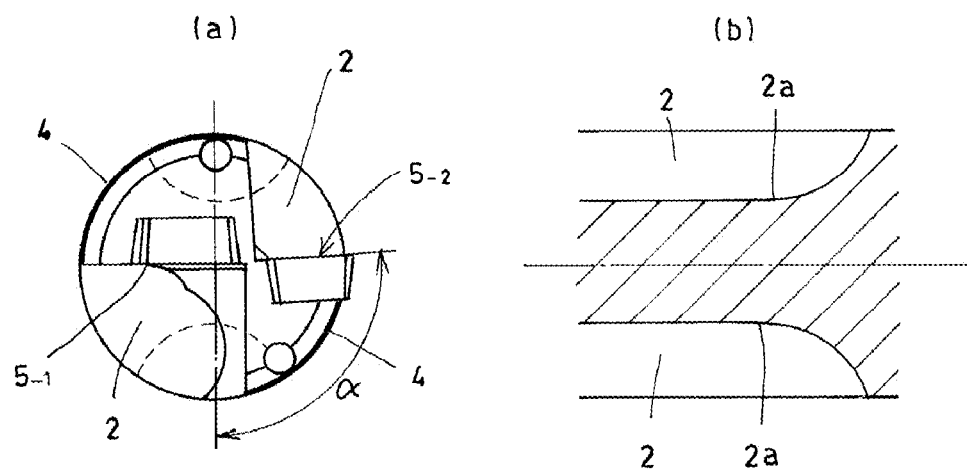
In FIG. 5, (a) is a front view illustrating the positional relationship between a peripheral cutting edge and terminal ends of helical flutes, and (b) is a developed sectional view of the terminal ends of the chip discharge flutes.

In the drill 10 shown as an example, the chip discharge flutes 2 (helical flutes) are formed so as to extend about ¼ turn around the drill main body 1. In FIG. 5(*a*), which shows an end face of the drill, a rise-start point 2*a* at a terminating end of each helical flute (center of the rise-start point in the width direction of the flute) is at a position separated from the peripheral cutting edge 9 by $\alpha=85°$ to $95°$ in the circumferential direction. Therefore, in a front view of the drill, terminating ends of two lands 4 of the drill main body 1 are positioned behind the insert-receiving sections in the axial direction of the drill, that is, on both sides relative to the direction in which the horizontal force component is applied in the hole-forming process, and portions of the drill main body are disposed at those positions. Therefore, the base end section of the drill main body 1 has enough strength to endure the horizontal force component and vibration of the drill main body due to the horizontal force component can be suppressed.

In the drill 10 shown as an example, an inclination angle $\theta$ (see FIGS. 1 and 2) relative to a line perpendicular to the rotational center is set to $5°$ for both of the center cutting edge 8 and the peripheral cutting edge 9. However, this angle can be set to an arbitrary angle as long as a concave angle $\beta$ (see FIG. 6(*a*)) of the peripheral cutting edge in the radial direction is not $0°$.

In addition, although a concave angle $\gamma 1$ of the center cutting edge 8 in the radial direction is set to $-5°$ and a concave angle $\gamma 2$ of the peripheral cutting edge 9 in the radial direction is set to $+5°$, the concave angles in the radial direction can be arbitrarily changed as long as the cutting quality and the endurance of the inserts are not affected.

In addition, it is not necessary that the center cutting edge 8 extend along a straight line, and the center cutting edge 8 may, for example, also be curved such that an intermediate section thereof in the radial direction projects forward in the axial direction.

In addition, in the drill according to the present invention, as long as there is no problem of space, three or more indexable inserts may also be combined together to form cutting edges.

EXAMPLE 1

To confirm the effects obtained by maintaining the ratio of the cutting contribution A of the center cutting edge and the cutting contribution B of the peripheral cutting edge 9 in the range of A:B=52:48 to 55:45 when the drill diameter is changed, the following experiment was performed using three types of drills (all of which have the shape shown in FIGS. 1 to 5) with the diameters D=18.5 mm, 20.0 mm, and 22.5 mm.

The experiment was performed using samples I to III. The ratio of the cutting contribution of the center cutting edge relative to that of the peripheral cutting edge was 50% in sample I, 52.5% in sample II, and 55.0% in sample III. Holes were formed under the conditions given below, and the thrust and the horizontal force component applied in the hole-forming process were measured with a Kistler dynamometer. In addition, the drill diameter and the entrance hole diameter, the intermediate hole diameter (diameter at the intermediate position in the depth direction), and the exit hole diameter of the holes formed with different feed rates were measured.

Figure 7:
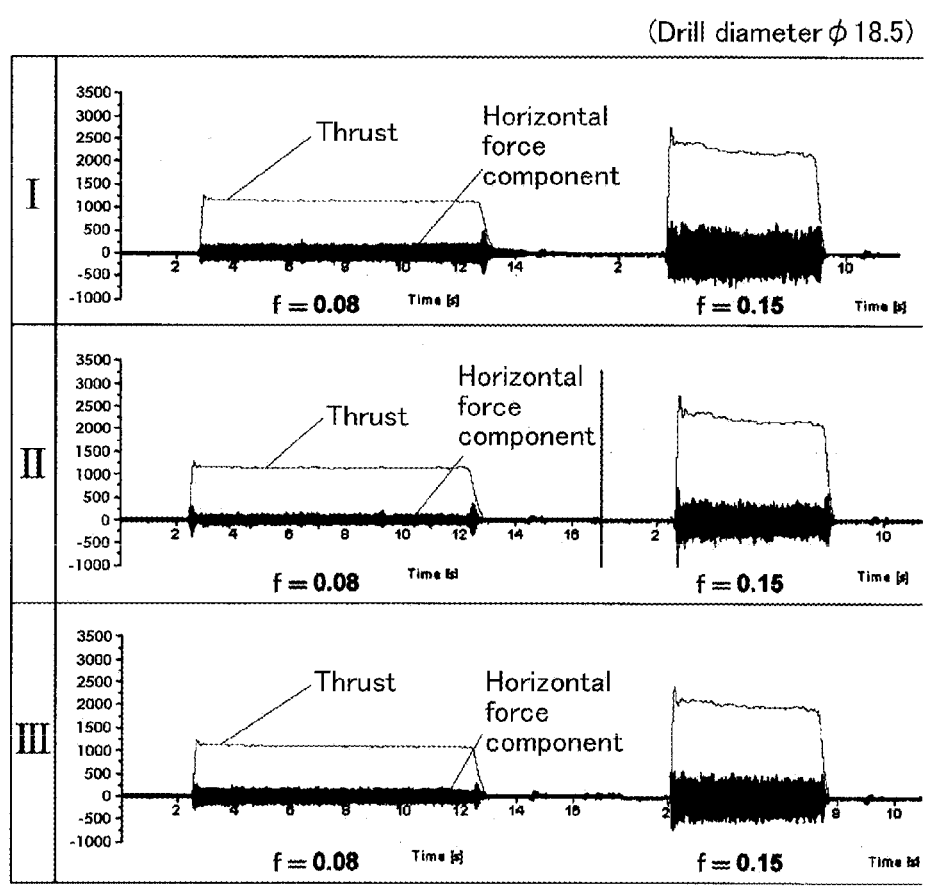
FIG. 7 is a diagram illustrating the measurement results of thrust and horizontal force component applied when sample drills having a diameter of 18.5 mm are used.
Figure 8:
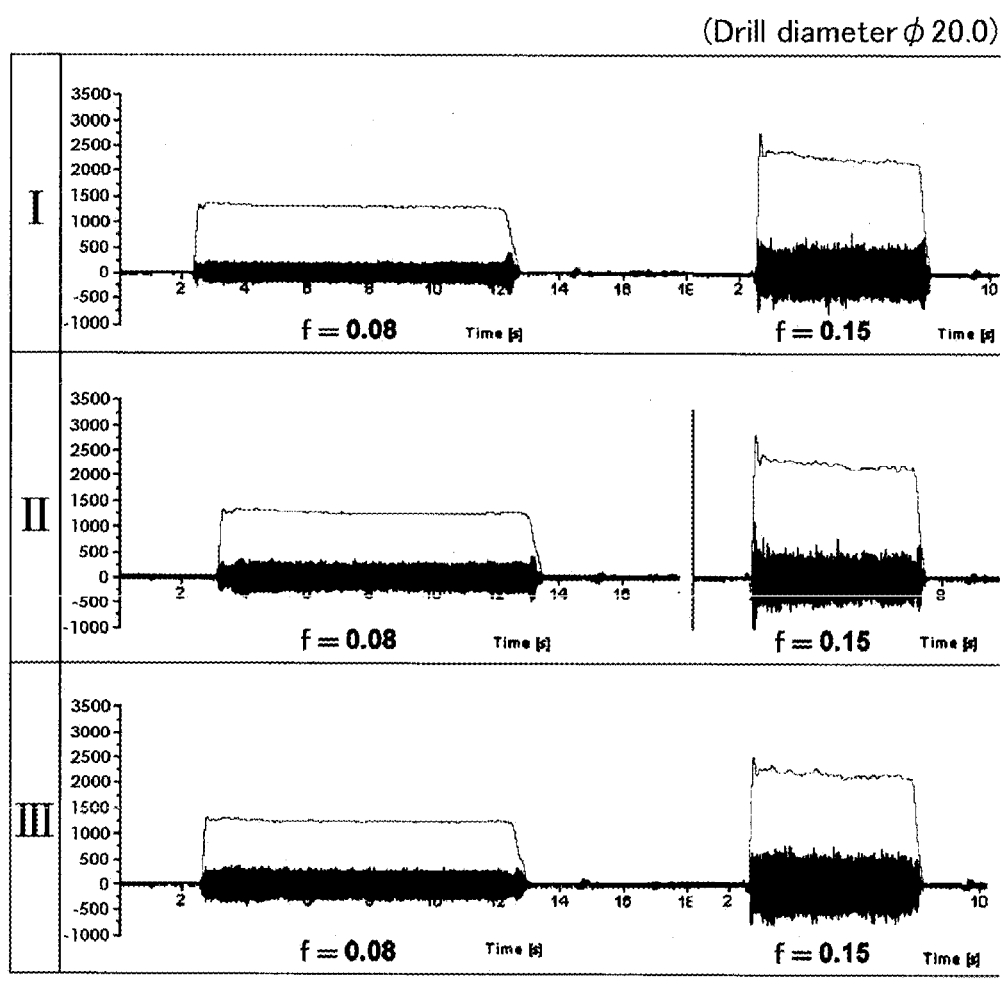
FIG. 8 is a diagram illustrating the measurement results of thrust and horizontal force component applied when sample drills having a diameter of 20.0 mm are used.
Figure 9:
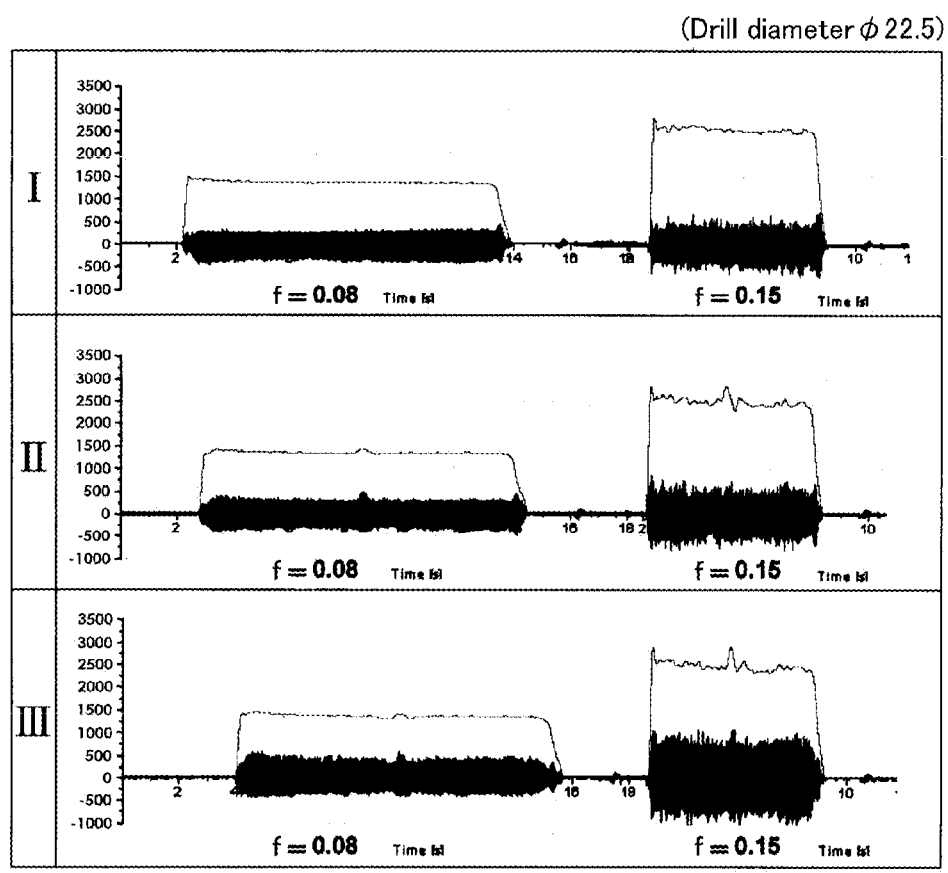
FIG. 9 is a diagram illustrating the measurement results of thrust and horizontal force component applied when sample drills having a diameter of 22.5 mm are used.

-Cutting Conditions-
  Material of workpiece: S50C
  Cutting velocity: V=175 m/min
  Feed rate: f=0.08 mm/rev and f=0.15 mm/rev
  Wet cutting The results of the experiment are shown in FIGS. 7 to 12. FIGS. 7 to 9 show the thrust S and the horizontal force component F applied when samples I to III were used and when the feed rate was f=0.08 mm/rev and f=0.15 mm/rev.

Figure 10:
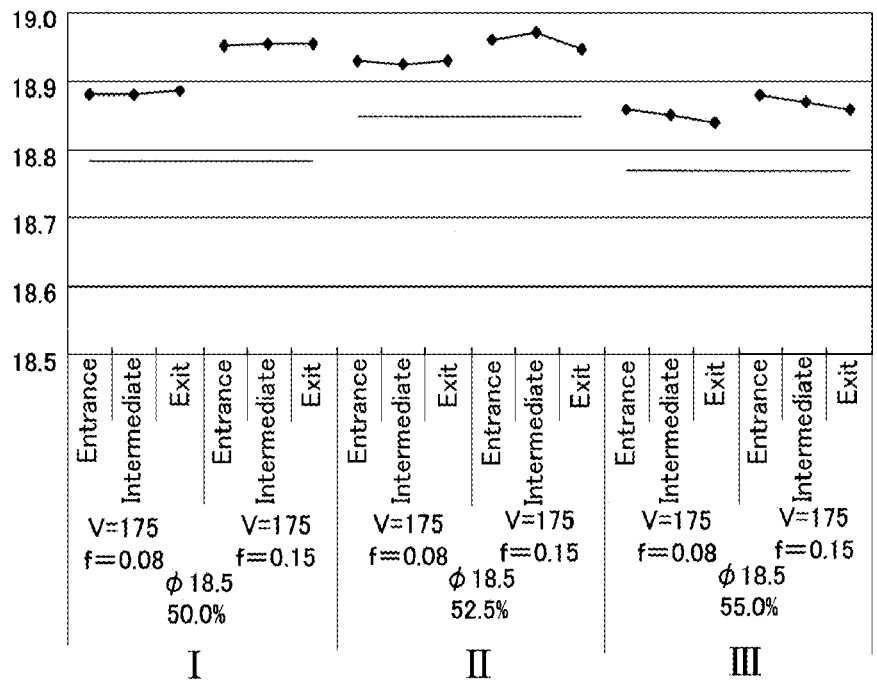
FIG. 10 is a diagram illustrating the variation tendency of inner diameter of holes formed by the sample drills having a diameter of 18.5 mm.
Figure 11:
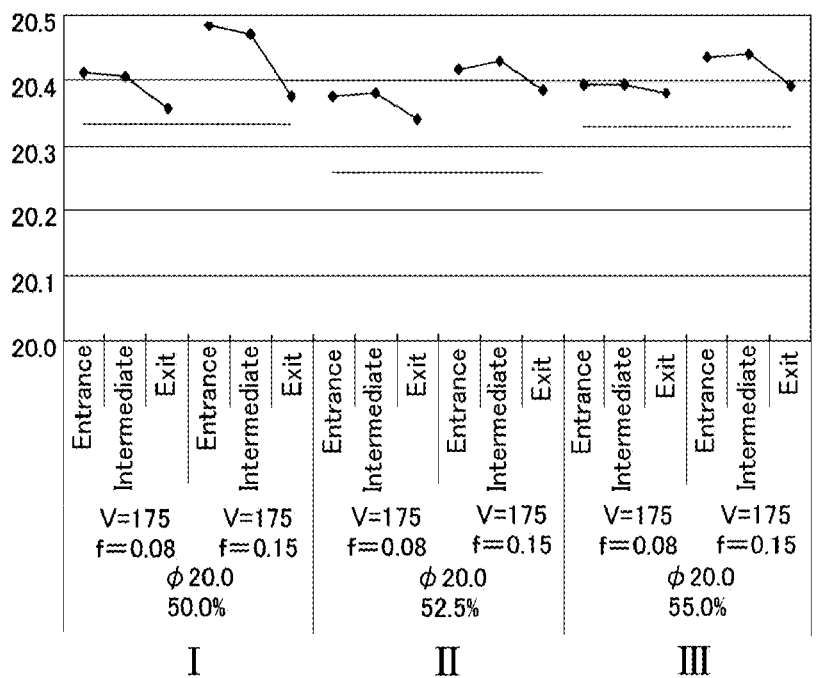
FIG. 11 is a diagram illustrating the variation tendency of inner diameter of holes formed by the sample drills having a diameter of 20.0 mm.
Figure 12:
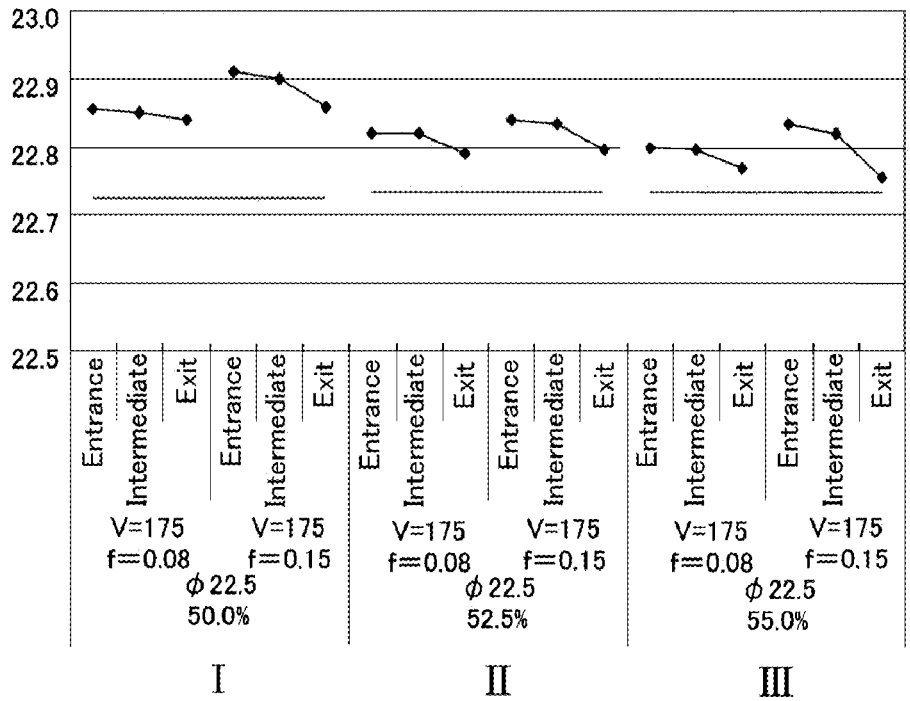
FIG. 12 is a diagram illustrating the variation tendency of inner diameter of holes formed by the sample drills having a diameter of 22.5 mm.

FIGS. 10 to 12 show the measured drill diameter and the diameter of the holes formed by samples I to III when the feed rate was f=0.08 mm/rev and f=0.15 mm/rev.

As is clear from the data shown in FIGS. 7 to 9, the thrust S and the horizontal force component F applied when sample II, in which the ratio of the cutting contribution A of the center cutting edge was 52.5%, was used are obviously smaller and more stable than those applied when sample I, in which the ratio A was 50.0%, and sample III, in which the ratio A was 55.0%, were used. In addition, as is clear from the data shown in FIGS. 10 to 12, when the feed rate is changed and the torque is changed accordingly, the variation tendencies of the hole diameter for different feed rates are similar to each other for sample II. Thus, the cutting performance of sample II is more stable than those of samples I and III.

EXAMPLE 2

Figure 13:
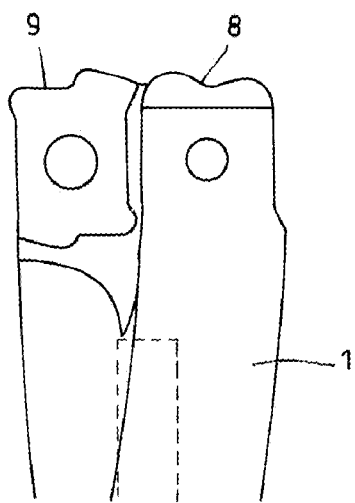
FIG. 13 is a diagram illustrating the shape of cutting edges of a comparative drill used in Example 2.

An experiment was performed in which holes were formed under the conditions given below using a drill with a diameter D=20 mm having the shape shown in FIGS. 1 to 5 (drill of the present invention) and a comparative drill having the same outer diameter (WDS200M3S25 produced by Sumitomo Electric Hardmetal Corp. (see FIG. 13 for the shape of cutting edges)). The horizontal force components X and Y applied when the dills engaged the workpiece were measured using a Kistler dynamometer.

Figure 14:
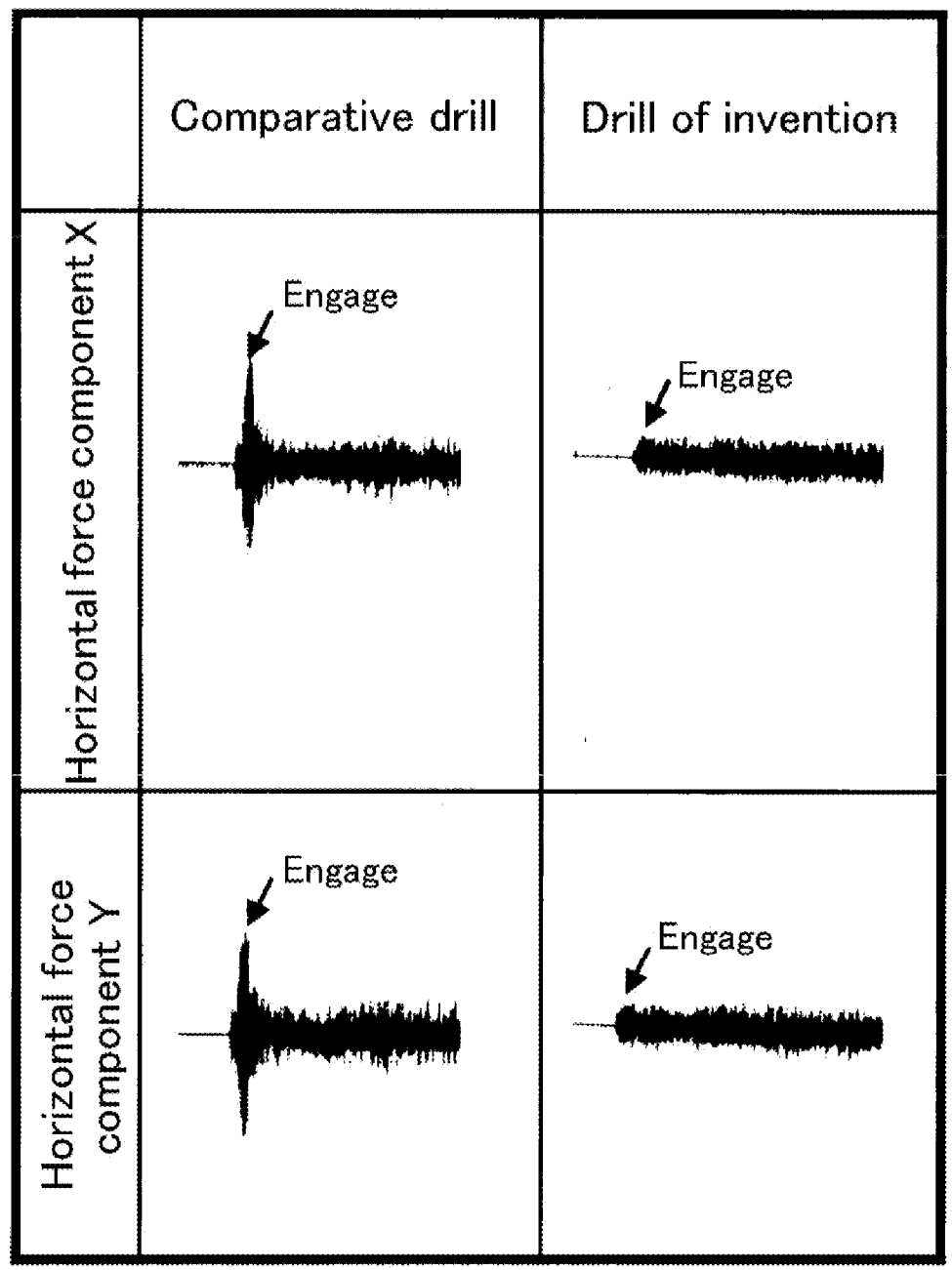
FIG. 14 shows an experiment result of Example 2 in which horizontal force components X and Y applied to the drill according to the present invention are compared with those applied to the comparative drill.

-Cutting Conditions-
  Material of workpiece: SCM415
  Cutting velocity: V=130 m/min
  Feed rate: f=0.10 mm/rev
  Hole depth: d=50 mm (through hole)
  Wet cutting FIG. 14 shows data obtained as a result of this experiment. The horizontal force components X and Y applied to the drill of the present invention at the time of engagement into the workpiece are smaller than those applied to the comparative drill, and variations in the horizontal force components is also small.

Figure 15:
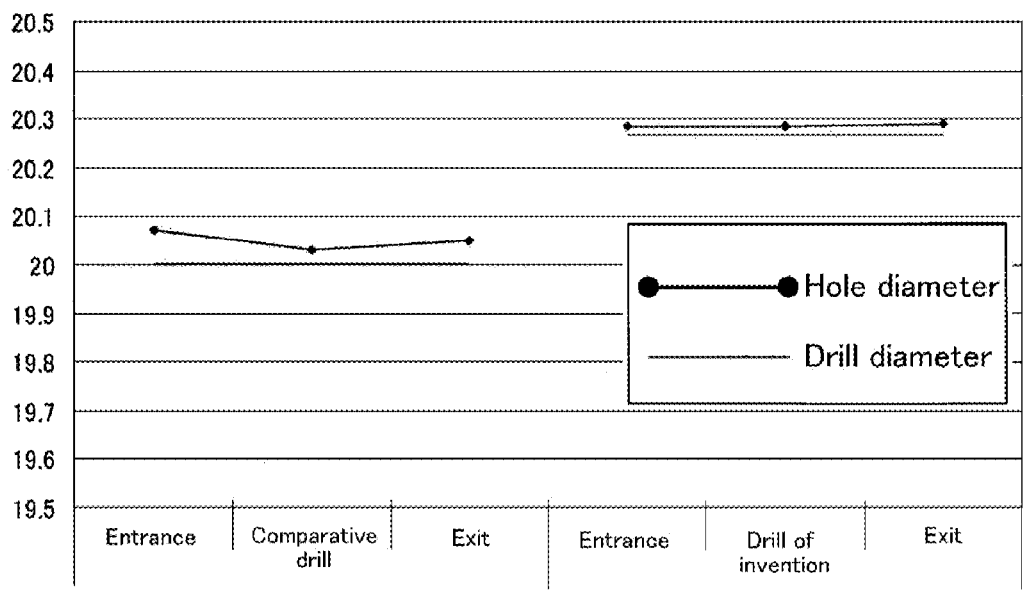
FIG. 15 shows another experiment result of Example 2 in which the variation tendency of inner diameter of the holes formed by the drill according to the present invention is compared with that of the holes formed by the comparative drill.
Figure 15:
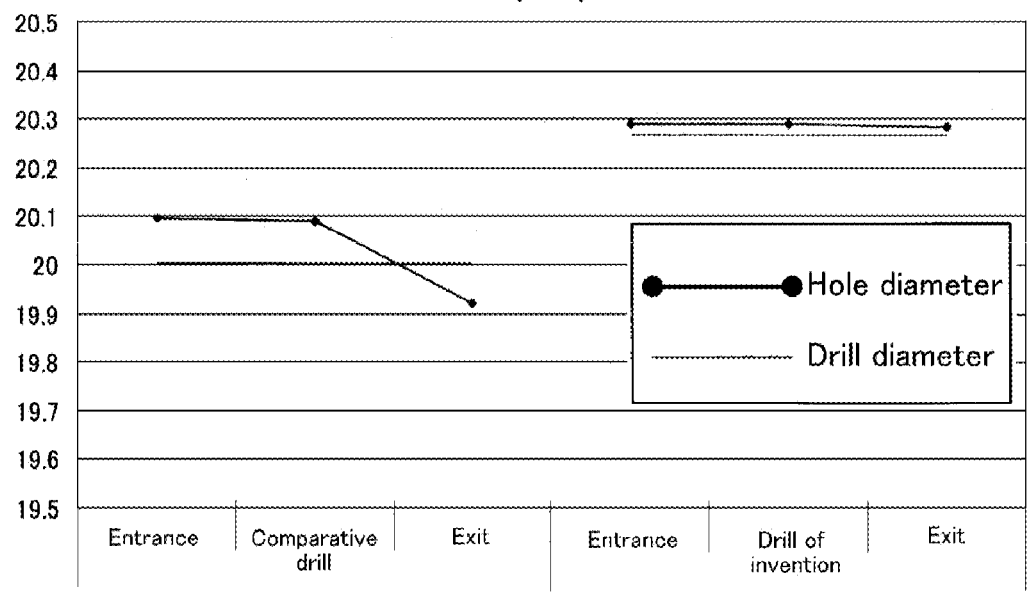
Figure 16:
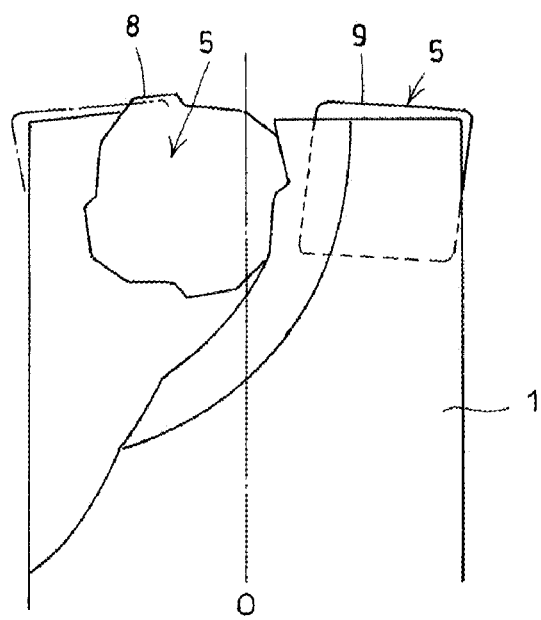
FIG. 16 is a diagram illustrating an example of the shape of cutting edges of a drill according to a related art which can be improved.
Figure 17:
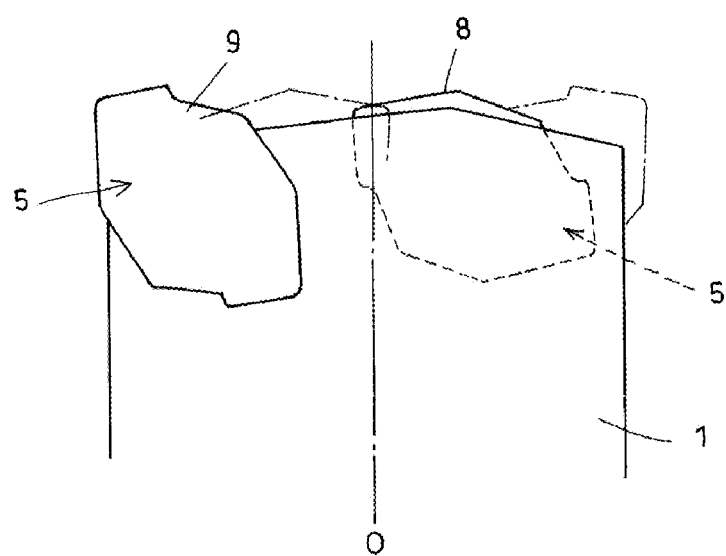
FIG. 17 is a diagram illustrating another example of the shape of cutting edges of a drill according to a related art which can be improved.
Figure 18:
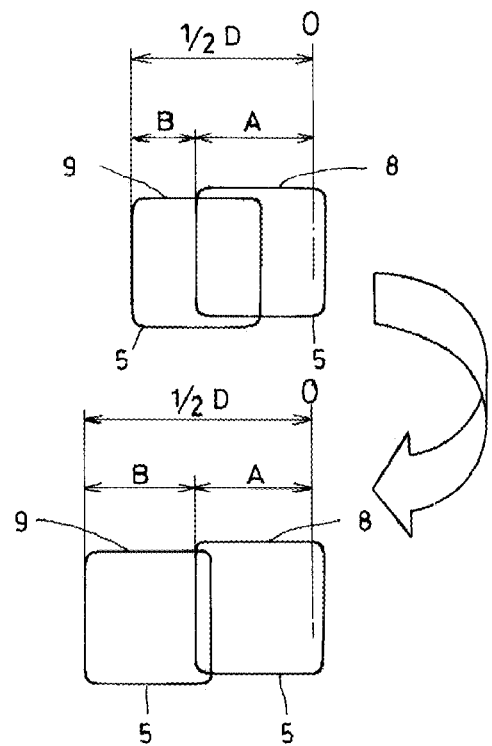
FIG. 18 is a diagram illustrating a method for changing the outer diameter of a drill according to a related art in which a center cutting edge and a peripheral cutting edge are formed of identical indexable inserts.

In addition, variations in the entrance hole diameter, the intermediate hole diameter, and the exit hole diameter relative to the measured drill diameter obtained when the feed rate was changed between f=0.10 mm/rev and f=0.15 mm/rev (other conditions are not changed) were observed. The result is shown in FIG. 15. With regard to the comparative drill, the hole diameters largely vary when the feed rate is changed and the exit hole diameter is considerably reduced when the feed rate is f=0.15 mm/rev. In contrast, with the drill of the present invention, the variation tendency of hole diameter is stable even when the feed rate is changed, and the exit hole diameter is hardly reduced.

EXAMPLE 3

Through holes were formed using the drill of the present invention and the comparative drill used in Example 2 under the conditions given below, and burrs generated at the exit side (side at which the drill exits the workpiece) of the holes were observed.

-Cutting Conditions-

Material of workpiece: SUS304
Cutting velocity: V=140 m/min
Rotational speed N=1783 min$^{-1}$
Feed rate: f=0.10 mm/rev and f=0.15 mm/rev
Hole depth: d=50 mm (through hole)
Wet cutting The result is explained below.

Figure 19:
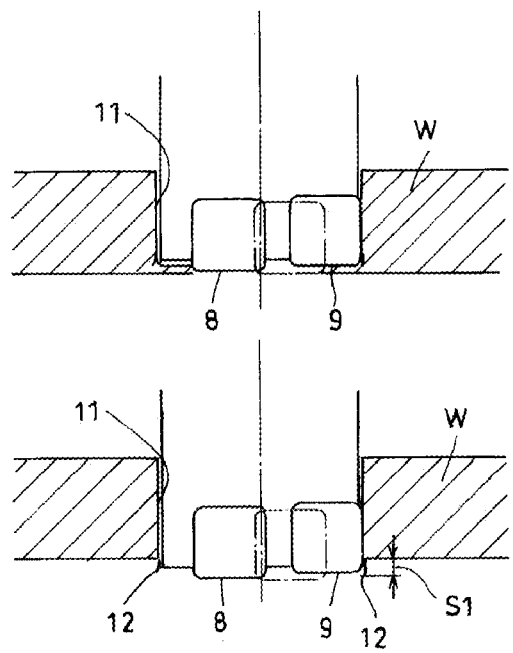
FIG. 19 is a diagram illustrating burrs generated at the exit edge of a through hole.

When the feed rate was f=0.10 mm/rev, the height (s1 in FIG. 19) of burrs generated was 0.80 mm at a maximum for the drill of the present invention was used, and was 1.20 mm at a maximum for a comparative drill.

When the feed rate was f=0.15 mm/rev, the height of burrs generated was 0.95 mm at a maximum when the drill of the present invention was used, and was 1.20 mm at a maximum a comparative drill was used.

It is clear from the above-described experiment result that generation of burrs can be suppressed by the drill of the present invention in which the outer peripheral section of the cutting edge exits the workpiece first.

EXAMPLE 4

Figure 20:
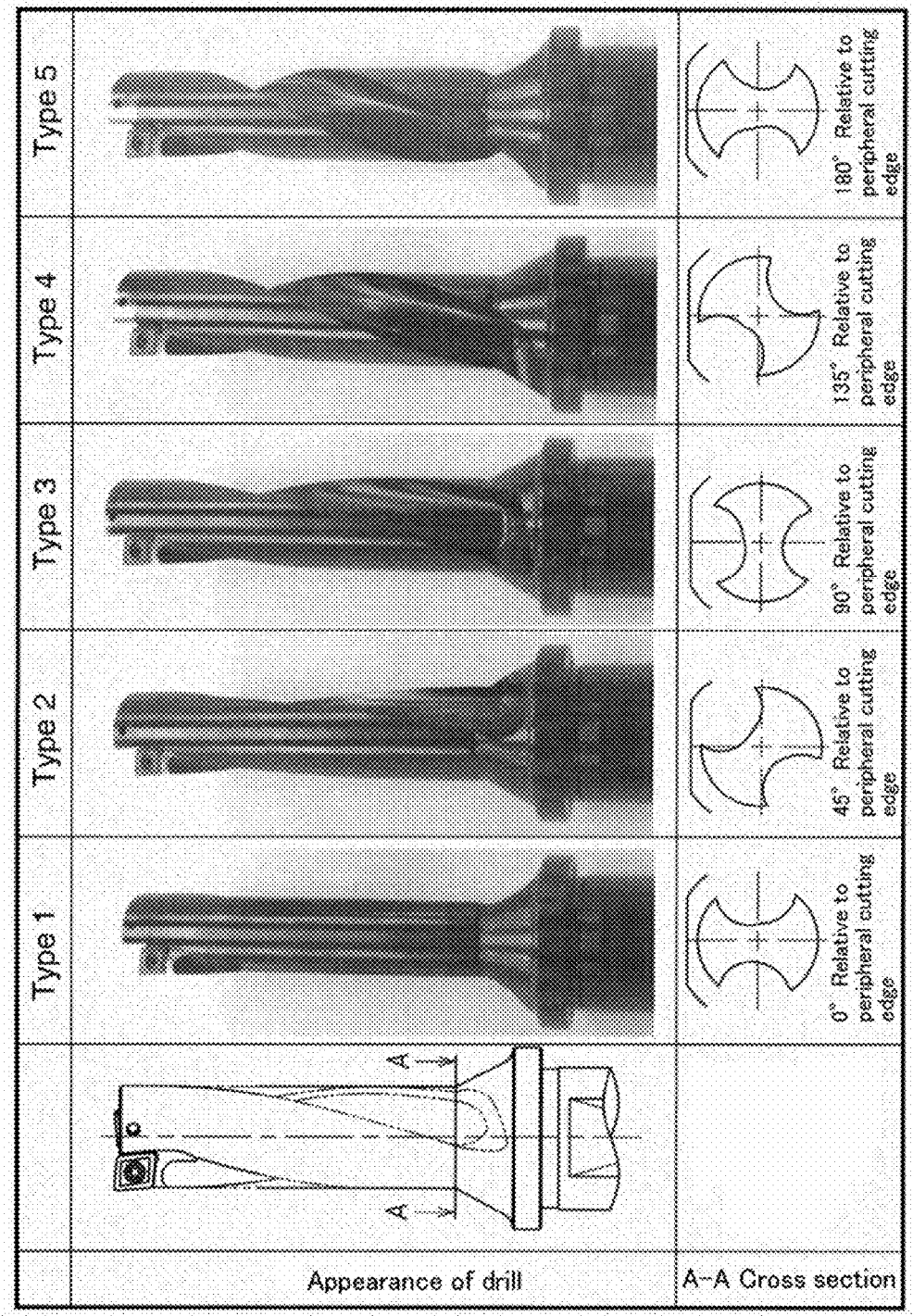
FIG. 20 is a diagram illustrating the shapes of drills of type 1 to type 5 used in an evaluation test performed in Example 4.

A performance evaluation test was performed for drills in which chip discharge flutes are formed as helical flutes in the outer periphery of the drill main body so as to extend about ¼ turn around the drill main body and in which a rise-start point of each helical flute at a terminating end thereof is at a position separated from the peripheral cutting edge by 85° to 95° in the circumferential direction. The evaluation test was performed using evaluation drills (drill diameter D=ϕ20.0 mm, L/D=4) having the shapes of types 1 to 5 shown in FIG. 20. L is an effective length.

Figure 21:
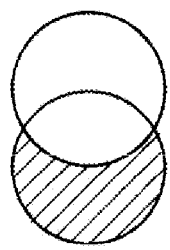
In FIG. 21, (a) is a diagram illustrating an irregular-shaped hole forming process performed in Example 4, and (b) is a diagram illustrating an oblique-engagement process performed in Example 4.
Figure 21:
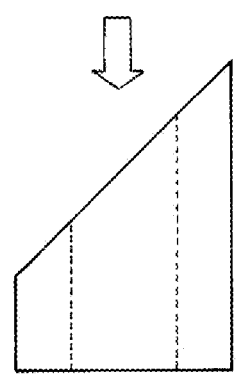

In the experiment, an irregular-shaped hole forming process {process of forming a shaded section of an irregular-shaped hole shown in FIG. 21(a)} and an oblique-engagement process {process of forming a hole in a workpiece having a surface inclined by 45° as shown in FIG. 21(b)} were performed as processes in which load is applied to the drill main body. Differences in hole-surface characteristics due to differences in the position of the rise-start point of each chip discharge flute were observed.

In the irregular-shaped hole forming process, the processing conditions were as follows. That is, the workpiece was S50C, the cutting velocity was V=130 m/min, the feed rate was f=0.10 mm/rev, and the cutting process was wet cutting. The processing conditions for the oblique engagement process were the same as those for the process of forming the irregular-shaped holes.

Figure 22:
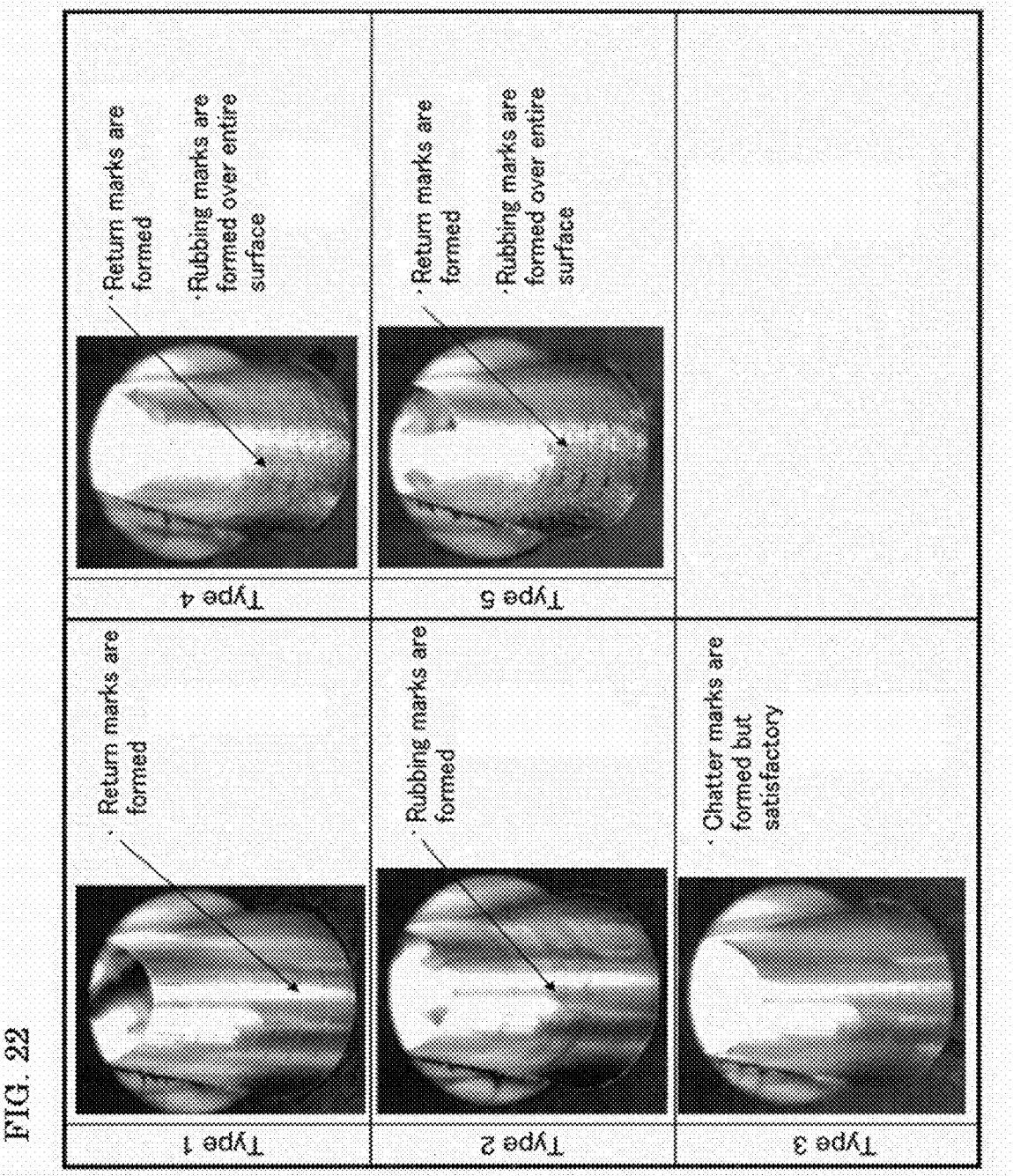
FIG. 22 shows photographs of surfaces obtained as a result of the irregular-shaped hole forming process.
Figure 23:
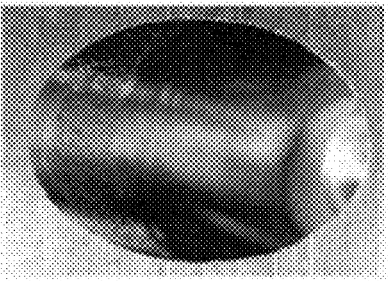
FIG. 23 shows photographs of surfaces obtained as a result of the oblique-engagement process.

FIG. 22 shows photographs of the surfaces obtained as a result of the irregular-shaped hole forming process, and FIG. 23 shows photographs of the surfaces obtained as a result of the oblique-engagement process. In both of the irregular-shaped hole forming process and the oblique-engagement process, there were very small differences in the cutting resistance between the drills having the shapes of types 1 to 5. However, with regard to the characteristics of the processed surfaces, the surfaces processed by the drill of type 3 were superior to those processed by other drills.

In the irregular-shaped hole forming process, rubbing marks were formed over the entire area of the surfaces processed by the drills of types 4 and 5, and return marks were also formed in the processed surfaces. The reason for this is presumably that the drill main bodies had small rigidities and were deflected in the cutting process. With regard to the drill of type 1, although no rubbing marks were formed, return marks were formed. The reason for this is also presumably that the drill was deflected in the cutting process. With regard to the drills of types 2 and 3, although slight chatter marks and rubbing marks were observed, it can be said that the processed surfaces had satisfactory characteristics as a whole.

In the oblique-engagement process, rubbing marks were formed over the entire area of the surfaces processed by the drills of types 1, 2, 4, and 5, and return marks were also formed in the processed surfaces. The reason for this is presumably that the drill main bodies had small rigidities and were deflected in the cutting process. With regard to the drill of type 3, although slight rubbing marks were observed, it can be said that the processed surfaces had satisfactory characteristics as a whole.

The invention claimed is:

1. A method for arranging inserts in an indexable drill, comprising the steps of:
    arranging a first indexable insert and a second indexable insert at an end of a drill main body at positions where distances from a rotational center (O) differ from each other and which are separated from each other by half turn in the circumferential direction of the drill;
    positioning the second indexable insert at an outer side of the drill so as to project forward in an axial direction from the first indexable insert at an inner side of the drill, so that an outer-end corner of the second indexable insert engages a workpiece first, and setting a ratio between a cutting contribution (A) of a center cutting edge formed of the first indexable insert and a cutting contribution (B) of a peripheral cutting edge formed of the second indexable insert in the range of A:B=52:48 to 55:45; and
    arranging the first and second indexable inserts at positions where the ratio between the cutting contributions of the center cutting edge and the peripheral cutting edge is maintained within the range of A:B=52:48 to 55:45 by changing the positions where both the peripheral cutting edge and the center cutting edge are fixed when an outer diameter of the indexable drill is changed.

2. The method for arranging inserts in an indexable drill according to claim 1, wherein the two indexable inserts used before the drill diameter changed are attached to a drill main body which is changed the drill diameter.

* * * * *